United States Patent [19]
Ono et al.

[11] 3,971,766
[45] July 27, 1976

[54] PRESSURE-SENSITIVE ADHESIVE AND PRESSURE-SENSITIVE ADHESIVE TAPE OR DRAPE

[75] Inventors: Tomoyoshi Ono, Hino; Yoshihiko Matsuguma, Hachioji, both of Japan

[73] Assignee: Teijin Limited, Osaka, Japan

[22] Filed: June 6, 1973

[21] Appl. No.: 367,474

[30] Foreign Application Priority Data
June 14, 1972 Japan.............................. 47-58582
July 26, 1972 Japan.............................. 47-74089

[52] U.S. Cl............................... 526/317; 526/320; 526/328; 428/336; 428/337; 428/355
[51] Int. Cl.²..................................... C08F 220/10
[58] Field of Search.................. 260/80.8, 78.5 UA; 450/746.5

[56] References Cited
UNITED STATES PATENTS

| | | | |
|---|---|---|---|
| 2,884,126 | 4/1959 | Ulrich | 206/59 |
| 3,725,115 | 4/1973 | Christenson et al. | 117/93.31 |
| 3,790,533 | 2/1974 | Samour | 260/78.5 R |
| 3,836,512 | 9/1974 | Chu | 260/80.73 |

*Primary Examiner*—Stanford M. Levin
*Attorney, Agent, or Firm*—Sherman & Shalloway

[57] ABSTRACT

A pressure-sensitive adhesive comprising as a main constituent a copolymer prepared by copolymerizing an alkyl acrylate with 2 to 6 mol% of acrylic acid or methacrylic acid and 0.002 to 0.05 mol% of a polyfunctional compound having at least 2 non-conjugated carbon-to-carbon double bonds per molecule.

11 Claims, No Drawings

PRESSURE-SENSITIVE ADHESIVE AND PRESSURE-SENSITIVE ADHESIVE TAPE OR DRAPE

This invention relates to a pressure-sensitive adhesive comprising a copolymer of an alkyl acrylate as a main constituent. It also relates to an adhesive tape or drape comprising a base sheet and a layer of the adhesive formed thereon.

Alkyl acrylate polymers have previously been used as pressure-sensitive adhesives, and it has been known that they have superior properties such as tackiness, anti-oxidation property or non-toxicity. However, these polymers have poor internal cohesive strength, and when used as pressure-sensitive tapes, they tend to cause the cohesive failure of the adhesive layer. An attempt has been made to remedy this defect by copolymerizing as much as at least 7 mol% of a polar monomer such as acrylic acid or methacrylic acid with the alkyl acrylate (see U.S. Pat. No. Re. 24906). However, such a conventional copolymer has only limited uses because of reduced resistance to water or organic solvents. Furthermore, it is preferred that when such a pressure-sensitive adhesive is used as a surgical tape or drape, the amount of the polar monomer which tends to react with the living body should be minimized for prevention of troubles such as the eruption of the skin.

Accordingly, an object of this invention is to provide a pressure-sensitive adhesive having moderate tackiness and adhesiveness, a high level of internal cohesive strength and superior solvent resistance and water resistance.

Another object of this invention is to provide a pressure-sensitive adhesive tape or drape having good adhesive properties.

It has now been found that a pressure sensitive adhesive comprising a copolymer prepared by copolymerizing an alkyl acrylate with 2 to 6 mol% of acrylic acid and/or methacrylic acid, and 0.002 to 0.05 mol% of a copolymer component having at least two non-conjugated carbon-to-carbon double bonds per molecule has moderate adhesiveness, a high level of internal cohesive strength, and superior solvent resistance.

According to this invention, there is provided a pressure-sensitive adhesive comprising as a main constituent a copolymer prepared by copolymerizing the following components:

1. 94 to 98 mol% of at least one alkyl acrylate with the alkyl group containing 1 to 14 carbon atoms, the average number of the carbon atoms being 4 to 12, or a mixture of said alkyl acrylate with methyl methacrylate and/or vinyl acetate in a mole ratio of 5 or more to 1,
2. 2 to 6 mol% of acrylic acid and/or methacrylic acid, and
3. 0.002 to 0.05 mol% of a polyfunctional compound copolymerizable with the monomers (1) and (2) and having at least two non-conjugated carbon-to-carbon double bonds per molecule.

A novel aspect of this invention is that a pressure-sensitive adhesive of superior quality can be obtained by conjointly using a small amount of acrylic acid and/or methacrylic acid which alone cannot enhance the internal cohesive strength of the resulting copolymer to an extent such as not to cause cohesive failure, and a very small amount of the polyfunctional compound which does not cause gellation, together with the alkyl acrylate.

The details of this mechanism are not known, but it is assumed that a pressure-sensitive adhesive having superior internal cohesive strength and solvent resistance can be prepared because the amounts of acrylic acid and/or methacrylic acid as a polar monomer are very small as compared with the conventional techniques, and that by copolymerizing a very small amount of the polyfunctional compound, the branching of the copolymer molecular chains or the intertwinings of the molecular chains with each other increases.

The alkyl acrylates with the alkyl group containing 1 to 14 carbon atoms can be used in this invention. But it is necessary that the average number of the carbon atoms of the alkyl groups should be at least 4.

The "average number of the carbon atoms of the alkyl groups", as used in the present specification and claims, is defined by the following equation.

$$\text{Average number of the carbon atoms of the alkyl groups} = \frac{\Sigma[n \times (\text{the moles of alkyl acrylates having } n \text{ carbon atoms in the alkyl groups})]}{(\text{total moles of the alkyl acrylates})}$$

Alkyl esters of acrylic acid in which the alkyl group has at least 4 carbon atoms are preferred. Examples of such alkyl acrylate are butyl acrylate, amyl acrylate, hexyl acrylate, heptyl acrylate, octyl acrylate, nonyl acrylate, decyl acrylate, and 2-ethylhexyl acrylate. Especially, the 2-ethylhexyl acrylate is preferred for its good adhesiveness imparting ability and from the commercial standpoint. Alkyl acrylates in which the alkyl group has less than 4 carbon atoms, such as ethyl acrylate or methyl acrylate, may also be used if the average number of the carbon atoms of the alkyl groups is at least 4. If the average number of the carbon atoms of the alkyl groups is less than 4, the resulting copolymer lacks tackiness.

Part of the alkyl acrylate may be replaced by methyl methacrylate and/or vinyl acetate. The amount of the other ester is 1 mol per at least 5 mols of the alkyl acrylate. This serves to increase the internal cohesive strength of the copolymer to a greater degree.

The polyfunctional compounds copolymerizable with the alkyl acrylate and acrylic acid and/or methacrylic acid and having at least 2 non-conjugated carbon-to-carbon double bonds per molecule may, for example, be diallyl phthalate, ethylene glycol dimethacrylate, polyethylene glycol dimethacrylate, trimethylol ethane trimethacrylate, or pentaerythritol tetramethacrylate. The polyethylene glycol dimethacrylate is especially preferred.

The proportions of the alkyl acrylate or a mixture of it with methyl methacrylate and/or vinyl acetate, the acrylic acid and/or methacrylic acid, and the polyfunctional compound in the resulting copolymer are an important factor which affects the adhesiveness and internal cohesive strength of the pressure-sensitive adhesive. It is essential that the proportion of the alkyl acrylate or a mixture of it with methyl methacrylate and/or vinyl acetate be 94 to 98 mol%, the proportion of the acrylic acid and/or methacrylic acid be 2 to 6 mol%, and the proportion of the polyfunctional compound be 0.002 to 0.05 mol%.

If the proportion of the alkyl acrylate or the mixture of it with methyl methacrylate and/or vinyl acetate is larger than 98 mol%, the adhesiveness of the resulting copolymer becomes excessively high to cause cohesive failure, and on the other hand, if it is below 94 mol%, the adhesiveness of the copolymer is insufficient. Thus, the proportions outside the range specified above are unsuitable. When the proportion of acrylic acid and/or methacrylic acid is less than 2 mol%, the internal cohesive strength becomes insufficient to cause cohesive failure. On the other hand, if it is larger than 6 mol%, the adhesiveness of the copolymer becomes low when it is used conjointly with the polyfunctional compound, and consequently, it loses pressure-sensitive adhesiveness at room temperature. Furthermore, when it is used as a medical material such as a surgical tape or drape, its activity on the living body increases. For example, when it is applied to the skin, it tends to cause the eruption of the skin. Accordingly, it is not desirable to increase the amount of the polar monomer such as acrylic acid or methacrylic acid. If the amount of the polyfunctional compound is more than 0.05 mol%, gellation occurs at the time of polymerization, and the resulting copolymer cannot be applied to a base sheet as an adhesive. On the other hand, if it is less than 0.002 mol%, cohesive failure occurs because of the lack of the internal cohesive strength.

The copolymer used in this invention can be produced easily by the solution polymerization method in which the monomers (1), (2) and (3) are dissolved in a suitable solvent and the solution is heated in the presence of a catalyst. Other polymerization methods such as emulsion polymerization may also be utilized. The catalyst used in the solution polymerization may suitably be a radical initiator such as benzoyl peroxide, azobisisobutyronitrile or lauryl peroxide. Such a catalyst is usually added in an amount of 0.2 to 2.0% by weight based on the total amount of the monomers. Useful solvents include esters such as methyl acetate or ethyl acetate; aromatic hydrocarbons such as benzene, toluene or xylene; alicyclic hydrocarbons such as cyclohexane; halogenated hydrocarbons such as methylene chloride or ethylene dichloride; and ketones such as acetone or methyl ethyl ketone. Ethyl acetate is especially preferred because of its suitable boiling point and good ability to dissolve the resultant copolymer. The concentration of the monomers at the time of polymerization is preferably 35 to 60% by weight. If the concentration is less than 35% by weight, the rate of polymerization becomes very slow, and conversely, when it is larger than 60% by weight, the rate of polymerization becomes very rapid, and there is an increased amount of the heat of polymerization. Usually when the polymerization is carried out for 5 to 10 hours at a temperature of 50° to 70°C., the copolymer can be obtained at a polymerization conversion of more than 95%.

In the emulsion polymerization method, the monomers are emulsified in water and polymerized in the presence of a water-soluble polymerization initiator. The amount of water used for this purpose is preferably 0.5 to 3 times the total weight of the monomers, and an emulsifier such as a sodium alkylaryl polyether sulfonate or alkyl arylsulfonate may be used. The polymerization initiator may be a water-soluble polymerization initiator such as potassium persulfate or ammonium persulfate. If a reducing agent such as sodium hydrogen sulfite is conjointly used, the polymerization can be performed rapidly at lower temperatures. The polymerization conditions differ according to the amount of the monomers, but the intended copolymers can be obtained easily when the polymerization is performed at a temperature about 20° to 70°C. for 1 to 10 hours.

As described above, the copolymer obtained by the present invention has superior adhesiveness, a high degree of internal cohesive strength and improved solvent resistance. Therefore, it is useful for producing an adhesive tape or sheet by coating it on a suitable base sheet, and can find applications in medical uses, stationary uses, electrical insulation, and industrial uses. Especially when a pressure-sensitive adhesive comprising the above copolymer is used for medical purposes such as a surgical tape or drape, it does not cause the eruption of the skin because of the good pressure-sensitive adhesiveness and the small amount of the polar monomer contained Furthermore, since it has good solvent resistance, the tape or drape can be easily sterilized by gas.

The invention will be described in greater detail by the following Examples in which all parts are by except as otherwise indicated weight. The properties of the resulting pressure-sensitive adhesives were evaluated by the following tests.

1. Bond strength

The resulting pressure-sensitive adhesive was coated on a polyethylene support having a thickness of 100 microns and a width of 1 cm to form an adhesive tape having an adhesive layer with a thickness of about 40 microns after drying. The adhesive tape was bonded to a stainless steel plate for one minute at a pressure of 1 Kg/cm$^2$, and pulled off from it at a pulling speed of 2 cm/min. in a direction of 180°. The peel strength (g/cm) at this time was measured, and made a measure of the bond strength of the adhesive.

2. Cohesive Strength

A solution of the pressure-sensitive adhesive was coated on two glass plates each havng a width of 2.6 cm, a length of 5 cm and a thickness of 0.8 mm, and after drying the glass plates were bonded to each other with the adhesive layers superposed to each other. The 0 degree pulling test was conducted with the bond area being 3.4 cm$^2$. The thickness of the adhesive layer was adjusted to 40 microns, and the shear strength at a pulling rate of 2 cm/min. was measured, and made a measure of the cohesive strength of the adhesive.

3. Cohesive failure

The 0° pulling test was conducted on the adhesive tape used for measuring the bond strength using a stainless steel plate. The presence of the adhesive remaining in the stainless steel plate was observed, and the cohesive failure was evaluated.

4. Solvent resistance

An adhesive tape with a size of 1 cm × 1 cm the same as used for measuring the bond strength was bonded to a thin sheet of paper, and immersed in a solvent while being maintained horizontal so that the adhesive tape faces downwards. The solvent resistance is expressed by the time required from the peeling of the adhesive tape to the fall of the removed tape.

EXAMPLE 1 AND COMPARATIVE EXAMPLES 1 TO 3

A reactor equipped with a reflux condenser and a stirrer was charged with 97.4 parts by weight of 2-ethylhexyl acrylate, 2.5 parts by weight of methacrylic acid, 0.1 part by weight of polyethylene glycol (degree of polymerization 14) dimethacrylate, 1.0 part by weight of benzoyl peroxide and 100 parts by weight of ethyl acetate, and the polymerization was performed for 9 hours with slow stirring at 60°C. in an atmosphere of nitrogen. The polymerization conversion was 99.9%. 300 parts by weight of ethyl acetate was added to the resulting polymer solution, and the solids concentration was adjusted to about 20%. The solution was then coated on a polyethylene film to form an adhesive tape. The bond strength, cohesive strength, cohesive failure, and solvent resistance of this tape were measured. The results are shown in Table 1.

For comparison, the above procedure was repeated except that the amounts of the methacrylic acid and polyetheylene glycol dimethacrylate were changed. The results are also shown in Table 1.

Example 1 is within the scope of the present invention, and both the adhesive porperty and solvent resistance proved superior. In Comparative Example 1, the amount of the polyfunctional compound exceeds the specified range, and during the polymerization, gellation occurred. In Comparative Example 3, the amount of methacrylic acid was increased from that in Comparative Example 2. Although there was no cohesive failure and the adhesive property was improved, the solvent resistance was apparently poor.

EXAMPLES 2 TO 4

Example 1 was repeated except that the proportions of the 2-ethylhexyl acrylate, methacrylic acid and polyethylene glycol dimethacrylate were changed to 94.8 mol%, 5.2 mol% and 0.01 mol% respectively, and the concentration of the monomers and the amount of the catalyst at the time of polymerization were changed as indicated in Example 1. The results are shown in Table 2.

Table 2

| | Polymerization conditions | | Adhesive properties | | | Solvent resistance | | |
|---|---|---|---|---|---|---|---|---|
| Examples | Concentration of the monomers (% by weight) | Benzoyl peroxide (parts) | Bond Strength (g/cm) | Cohesive strength (g/cm$^2$) | Cohesive failure | Acetone (sec.) | Toluene (sec.) | Isopropanol (sec.) |
| 2 | 60 | 1.0 | 85 | 2400 | None | >1000 | >100 | >1800 |
| 3 | 50 | 0.5 | 88 | 3800 | " | >1000 | 60 | 780 |
| 4 | 50 | 1.0 | 70 | 3400 | " | >1000 | 59 | 700 |

As is clear from Table 2, the pressure-sensitive adhesive obtained from the monomers having the proportions as defined by the present invention exhibited superior adhesive properties and solvent resistance.

EXAMPLES 5 TO 7 AND COMPARATIVE EXAMPLES 4 TO 6

Example 1 was repeated except that the types and amounts of the monomers were changed as shown in Table 3. The results are also shown in Table 3.

Examples 5 to 7 are within the scope of the present invention, and both the adhesive properties and solvent resistance of the resulting adhesives were very good. In Comparative Example 4, no polyfunctional compound was used to prepare the adhesive, and cohesive failure occurred. Comparative Example 5 covered the case of increasing the amount of acrylic acid as compared with Comparative Example 4, and exhibited improved adhesive properties but poor solvent resistance. In Comparative Example 6, the amount of the polyfunctional compound exceeded the upper limit of the range specified in the present invention, and resulted in gellation during polymerization.

Table 1

| | Proportions of the copolymer components (parts by weight) *The figures in parentheses ( ) are mole percent | | | Adhesive properties | | | Solvent resistance | | |
|---|---|---|---|---|---|---|---|---|---|
| Examples | 2-Ethylhexyl acrylate | Methacrylic acid | Polyethylene glycol dimethacrylate | Bond strength (g/cm) | Cohesive strength (g/cm$^2$) | Cohesive failure | Acetone (sec.) | Toluene (sec.) | Isopropanol (sec.) |
| Example 1 | 97.4 (94.8) | 2.5 (5.2) | 0.10 (0.02) | 70 | 3300 | None | 1000 | 56 | 1800 |
| Comparative Example 1 | 97.4 (94.8) | 2.5 (5.2) | 0.35 (0.08) | Gellation occurred during polymerization | | | | | |
| Comparative Example 2 | 97.4 (94.8) | 2.5 (5.2) | 0 (0) | 130 | 1800 | Yes | 450 | 46 | 480 |
| Comparative Example 3 | 95.0 (89.9) | 5.0 (10.1) | 0 (0) | 40 | 3400 | None | 92 | 37 | 195 |

Table 3

| | Proportions of the copolymer components (mol%) | | | | | | Adhesive properties | | | Solvent resistance | | |
|---|---|---|---|---|---|---|---|---|---|---|---|---|
| | 2-ethyl-hexyl acrylate | n-butyl acrylate | methyl acrylate | acrylic acid | methacrylic acid | polyethylene glycol dimethacrylate | Bond strength (g/cm) | Cohesive strength (g/cm²) | Cohesive failure | Acetone (sec.) | Toluene (sec.) | Isopropanol (sec.) |
| Example 5 | — | 94.9 | — | — | 5.1 | 0.016 | 65 | 4200 | None | >1000 | 55 | >1800 |
| Example 6 | 81.0 | — | 14.2 | — | 4.8 | 0.020 | 86 | 4500 | " | >1000 | 54 | >1800 |
| Example 7 | 95.0 | — | — | 5.0 | — | 0.010 | 130 | 6800 | " | >1000 | >100 | >1800 |
| Comparative Example 4 | 95.0 | — | — | 5.0 | — | — | 320 | 1100 | Yes | 500 | 32 | 900 |
| Comparative Example 5 | 88.2 | — | — | 11.8 | — | — | 260 | 8000 | None | 150 | 35 | 310 |
| Comparative Example 6 | 95.0 | — | — | 5.0 | — | 0.070 | Gellation occured during polymerization | | | | | |

EXAMPLES 8 TO 11

Example 1 was repeated except that other polyfunctional compounds as indicated in Table 4 were used instead of the polyethylene glycol dimethacrylate. The results obtained are shown in Table 4. The amount of each of the polyfunctional compounds was 0.02 mol%.

As is clear from Table 4, the adhesive properties of the products were good in all of Examples 8 to 12 which are within the scope of the present invention. Furthermore, the solvent resistance of the products was as good as in Example 1.

Table 4

| Examples | Polyfunctional compound | Adhesive properties | | |
|---|---|---|---|---|
| | | Bond strength (g/cm) | Cohesive strength (g/cm²) | Cohesive failure |
| 8 | Ethylene glycol dimethacrylate | 105 | 2800 | None |
| 9 | Trimethylol ethane trimethacrylate | 85 | 8300 | " |
| 10 | Pentaerylthitol tetramethacrylate | 105 | 2700 | " |
| 11 | Diallyl phthalate | 78 | 2800 | " |

COMPARATIVE EXAMPLES 7 TO 10

Example 1 was repeated except that the types and amounts of the monomers were changed as shown in Table 5. The results are also shown in Table 5.

It is clear from Table 5 that when acrylamide or acrylonitrile was copolymerized as the polar monomer, cohesive failure occurred, and it was impossible to obtain a pressure-sensitive adhesive of good quality.

Table 5

| Comparative Examples | Proportions of the copolymer components (mol%) | | | | Adhesive properties | | |
|---|---|---|---|---|---|---|---|
| | 2-ethylhexyl acrylate | acrylamide | acrylonitrile | polyethylene glycol dimethacrylate | Bond strength (g/cm) | Cohesive strength (g/cm²) | Cohesive failure |
| 7 | 95.0 | 5.0 | — | — | 230 | 6900 | Yes |
| 8 | 95.0 | 5.0 | — | 0.02 | 105 | 6100 | " |
| 9 | 94.7 | — | 5.3 | — | 40 | 500 | " |
| 10 | 94.7 | — | 5.3 | 0.02 | 70 | 1500 | " |

EXAMPLE 12

A reactor equipped with a reflux condenser and a stirrer was charged with 90.0 parts of 2-ethylhexyl acrylate, 2.5 parts of methacrylic acid, 7.5 parts of vinyl acetate, 0.05 part of polyethylene glycol (degree of polymerization 14) dimethacrylate, 1.0 part of benzoyl peroxide and 100 parts of ethyl acetate, and the polymerization was continued for 9 hours with slow stirring at a temperature of 60°C. in an atmosphere of nitrogen. The polmerization conversion was 99.9 %. To the resulting polymer solution 300 parts of ethyl acetate was added, and the solids concentration was adjusted to about 20 %. The resulting solution was coated on a polyethylene film to form an adhesive tape. This tape had a bond strength of 130 g/cm, and a cohesive strength of 5250 g/cm².

EXAMPLES 13 TO 16 AND COMPARATIVE EXAMPLES 11 TO 13

Example 12 was repeated except that the monomers shown in Table 6 were used. The bond strength and cohesive strength of the copolymers are shown in Table 6. The results of Example 12 are also shown in Table 6.

Table 6

| | Proportions of the copolymer components (mol %) | | | | | | Adhesive properties | |
|---|---|---|---|---|---|---|---|---|
| | 2-ethyl-hexyl acrylate | acrylic acid | Meth-acrylic acid | vinyl acetate | methyl meth-acrylate | styrene | poly-ethylene glycol dimeth-acrylate | Bond strength (g/cm) | Cohesive strength (g/cm²) |
| Example 12 | 80.8 | — | 4.8 | 14.4 | — | — | 0.01 | 130 | 5250 |
| Example 13 | 80.8 | — | 4.8 | 14.4 | — | — | 0.006 | 145 | 5330 |
| Example 14 | 82.5 | — | 4.9 | — | 12.6 | — | 0.01 | 100 | 4540 |
| Example 15 | 80.6 | 5.0 | — | 14.4 | — | — | 0.01 | 210 | 8800 |
| Example 16 | 82.3 | 5.1 | — | — | 12.6 | — | 0.01 | 195 | 9200 |
| Comparative Example 11 | 66.4 | — | 4.8 | 28.8 | — | — | 0.01 | 50 | 7140 |
| Comparative Example 12 | 80.8 | — | 4.8 | — | — | 14.4 | 0.01 | 103 | 1480 |
| Comparative Example 13 | 89.9 | — | 10.1 | — | — | — | — | 40 | 3400 |

It is seen from Table 6 that by replacing part of the 2-ethylhexyl acrylate with vinyl acetate or methyl methacrylate in the 2-ethylhexyl acrylate-methacrylic acid-polyethylene glycol dimethacrylate, marked improvement in bond strength and cohesive strength was observed.

Comparative Example 11 covered the case in which the amount of vinyl acetate was outside the range specified in the present invention. When the amount of vinyl acetate is too large, the cohesive strength of the resulting copolymer was improved but the bond strength was reduced remarkably. In Comparative Example 12, styrene was copolymerized instead of the vinyl acetate or methyl methacrylate, and in this case, the cohesive strength was reduced remarkably.

What we claim is:

1. A pressure-sensitive adhesive comprising as a main constituent a copolymer comprising:
   1. 94 to 98 mol% based on the total of components (1) and (2) of at least one alkyl acrylate monomer with the alkyl group containing 1 to 14 carbon atoms, the average number of the carbon atoms being 4 to 12, or a mixture of said alkyl acrylate with another monomer selected from the group consisting of methyl methacrylate, vinyl acetate and mixtures thereof, in a mol ratio of said alkyl acrylate to said other monomer of at least 5 to 1,
   2. 2 to 6 mol% based on the total of components (1) and (2) of a monomer selected from the group consisting of acrylic acid, methacrylic acid, and mixtures thereof, and
   3. 0.002 to 0.05 mol% based on the total of components (1) and (2) of a polyfunctional compound copolymerizable with the monomers (1) and (2) and having at least two non-conjugated carbon-to-carbon double bonds per molecule with the proviso that the amounts of component (1) and component (2) totals 100 mol%; said copolymer prepared by copolymerizing components (1), (2) and (3) by solution polymerization or emulsion polymerization.

2. The pressure-sensitive adhesive of claim 1 wherein said alkyl acrylate is 2-ethylhexyl acrylate.

3. The pressure-sensitive adhesive of claim 1 wherein said alkyl acrylate monomer is selected from the group consisting of butyl acrylate, amyl acrylate, hexyl acrylate, heptyl acrylate, octyl acrylate, nonyl acrylate, decyl acrylate, and 2-ethylhexyl acrylate.

4. The pressure-sensitive adhesive of claim 1 wherein said polyfunctional compound is selected from the group consisting of diallyl phthalate, ethylene glycol dimethacrylate, polyethylene glycol dimethacrylate, trimethylol ethane trimethacrylate, and pentaerthritol tetramethacrylate.

5. The pressure-sensitive adhesive of claim 1 wherein said monomer component (1) comprises 94 to 98 mol% of at least one alkyl acrylate monomer with the alkyl group containing 1 to 14 carbon atoms, the average number of the carbon atoms being 4 to 12, and another monomer selected from the group consisting of methyl methacrylate, vinyl acetate and mixtures thereof in a mol ratio of at least 5 to 1.

6. The pressure-sensitive adhesive of claim 5 wherein said other monomer is methyl methacrylate.

7. The pressure-sensitive adhesive of claim 5 wherein said other monomer is vinyl acetate.

8. The pressure-sensitive adhesive of claim 1 wherein said polyfunctional compound is polyethylene glycol dimethacrylate.

9. The pressure-sensitive adhesive of claim 1 wherein said polyfunction compound is ethylene glycol dimethacrylate.

10. The pressure sensitive adhesive of claim 1 wherein said polyfunctional compound is trimethylol ethane trimethacrylate.

11. The pressure sensitive adhesive of claim 1 wherein said polyfunctional compound is pentaerythritol tetramethacrylate.

* * * * *